US009737191B2

(12) United States Patent
Durham et al.

(10) Patent No.: US 9,737,191 B2
(45) Date of Patent: Aug. 22, 2017

(54) VARIABLE POSITION DIVERTER FOR AN APPLIANCE

(71) Applicant: General Electric Company, Schenectady, NY (US)

(72) Inventors: Kyle Edward Durham, Louisville, KY (US); Craig Curtis, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 14/849,709

(22) Filed: Sep. 10, 2015

(65) Prior Publication Data

US 2017/0071441 A1    Mar. 16, 2017

(51) Int. Cl.
*A47L 15/42* (2006.01)
*F16K 11/074* (2006.01)
*F16K 31/524* (2006.01)

(52) U.S. Cl.
CPC ........ *A47L 15/4221* (2013.01); *F16K 11/074* (2013.01); *F16K 31/52483* (2013.01)

(58) Field of Classification Search
CPC .... F16K 11/072; F16K 11/074; F16K 11/078; F16K 31/528; A47L 15/4221; A47L 15/4289; A47L 15/4225; A47L 2501/03; A47L 2501/05
See application file for complete search history.

(56) References Cited

U.S. PATENT DOCUMENTS

| | | | |
|---|---|---|---|
| 3,924,652 A * | 12/1975 | Kah, Jr. | F16K 11/078 137/119.03 |
| 7,047,986 B2 | 5/2006 | Ertle et al. | |
| 8,834,648 B2 | 9/2014 | Fountain | |
| 8,858,729 B2 | 10/2014 | Buddharaju et al. | |
| 8,915,257 B2 | 12/2014 | Büsing et al. | |
| 8,978,674 B2 | 3/2015 | Büsing et al. | |
| 9,027,578 B2 | 5/2015 | Boyer et al. | |
| 2010/0139698 A1 | 6/2010 | Gnadinger et al. | |
| 2012/0266924 A1 * | 10/2012 | Boyer | A47L 15/4221 134/198 |
| 2012/0318389 A1 | 12/2012 | Holstein et al. | |
| 2014/0182625 A1 | 7/2014 | Lee et al. | |
| 2015/0230687 A1 * | 8/2015 | Dries | A47L 15/23 134/200 |

* cited by examiner

*Primary Examiner* — David Cormier
(74) *Attorney, Agent, or Firm* — Dority & Manning, P.A.

(57) ABSTRACT

A variable position diverter that provides wash fluid to selected combinations of outlet ports and spray assemblies. The diverter includes a housing having a first fluid outlet, a second fluid outlet, and a valve disk having four apertures. The valve disk is rotated relative to the housing to align one or more of the four apertures with one or both of the first fluid outlet and the second fluid outlet to selectively control the flow of wash fluid through corresponding spray assemblies. Selectively diverting wash fluid in this manner can improve wash performance and reduce cycle time while meeting government regulations regarding water usage.

20 Claims, 17 Drawing Sheets

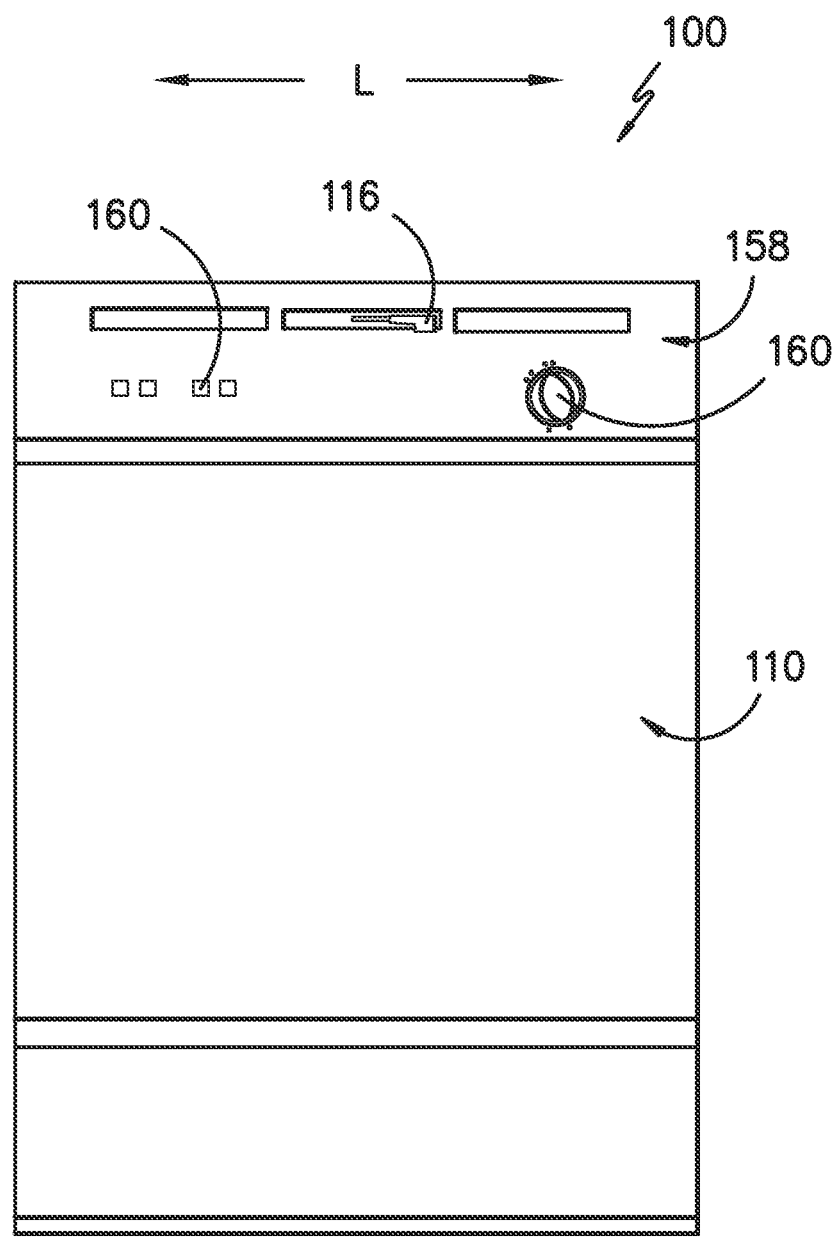
FIG. -1-

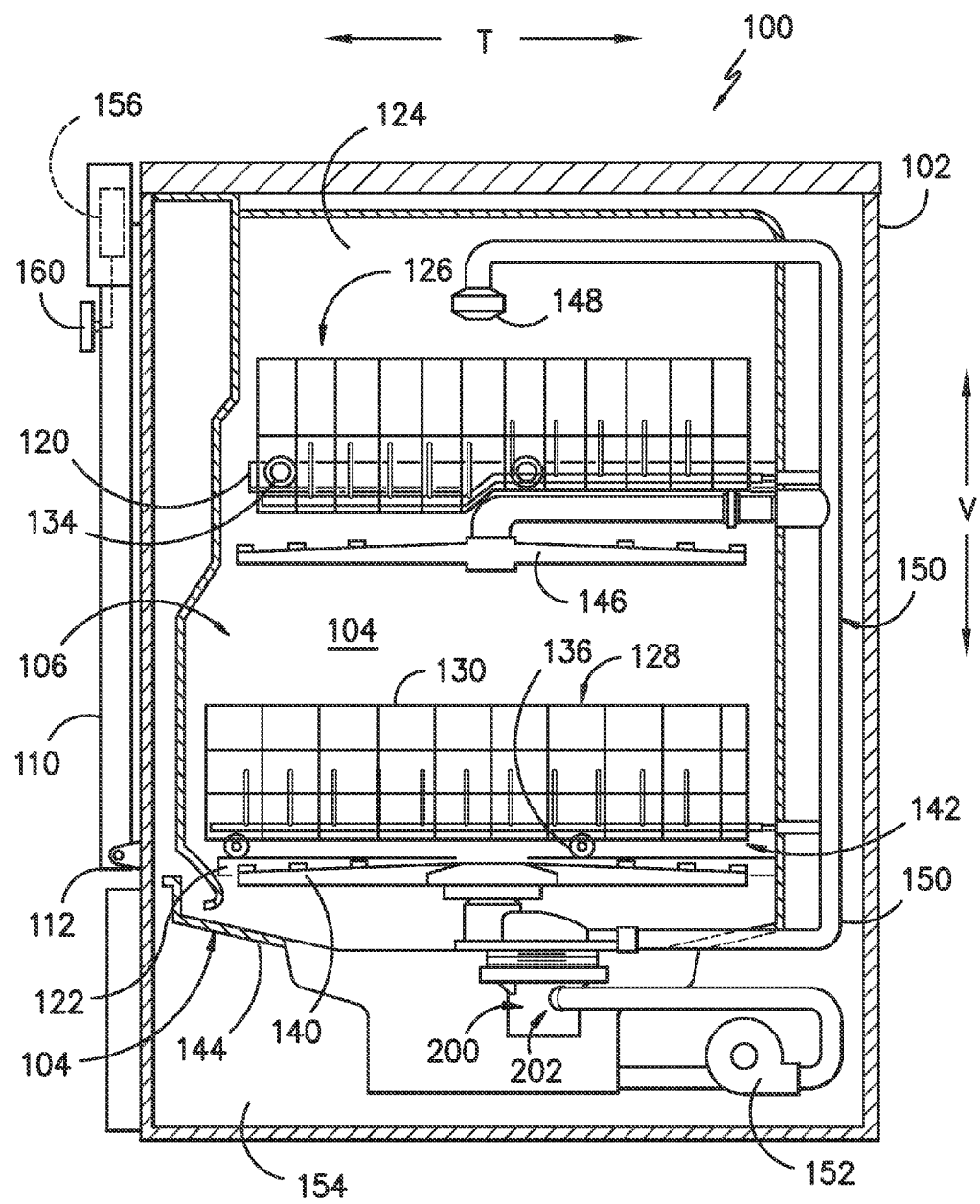
FIG. -2-

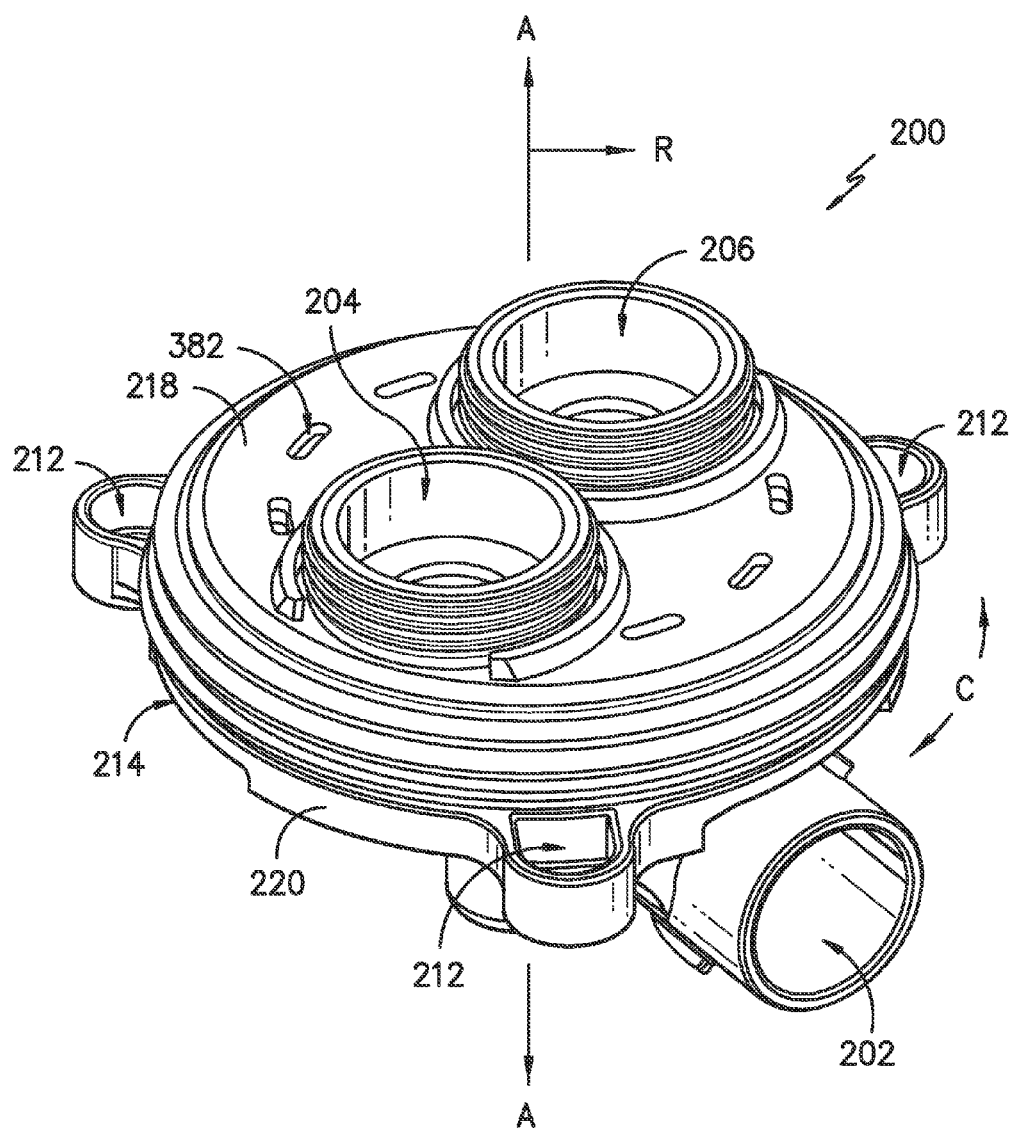
FIG. -3-

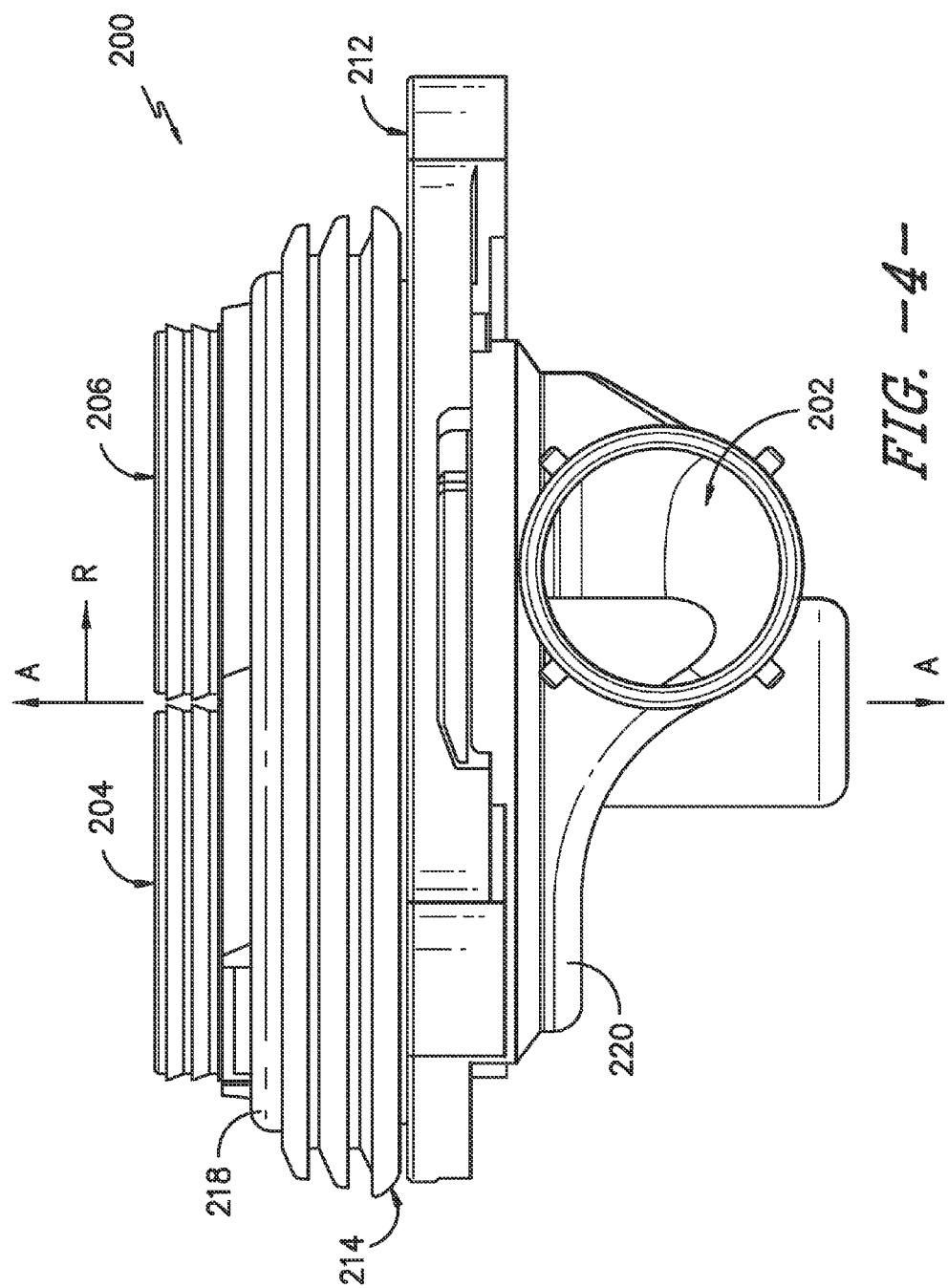
FIG. -4-

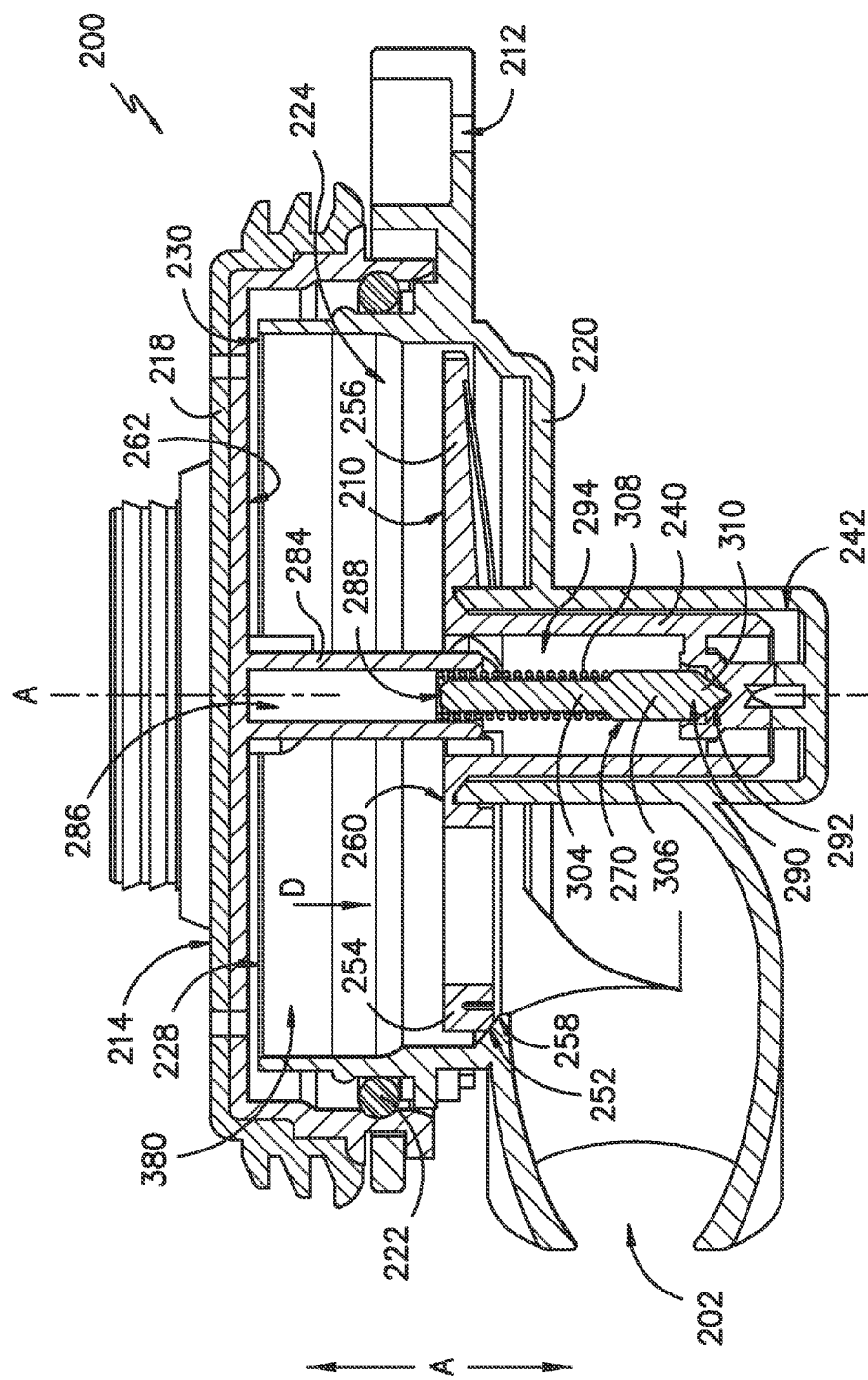
FIG. -5-

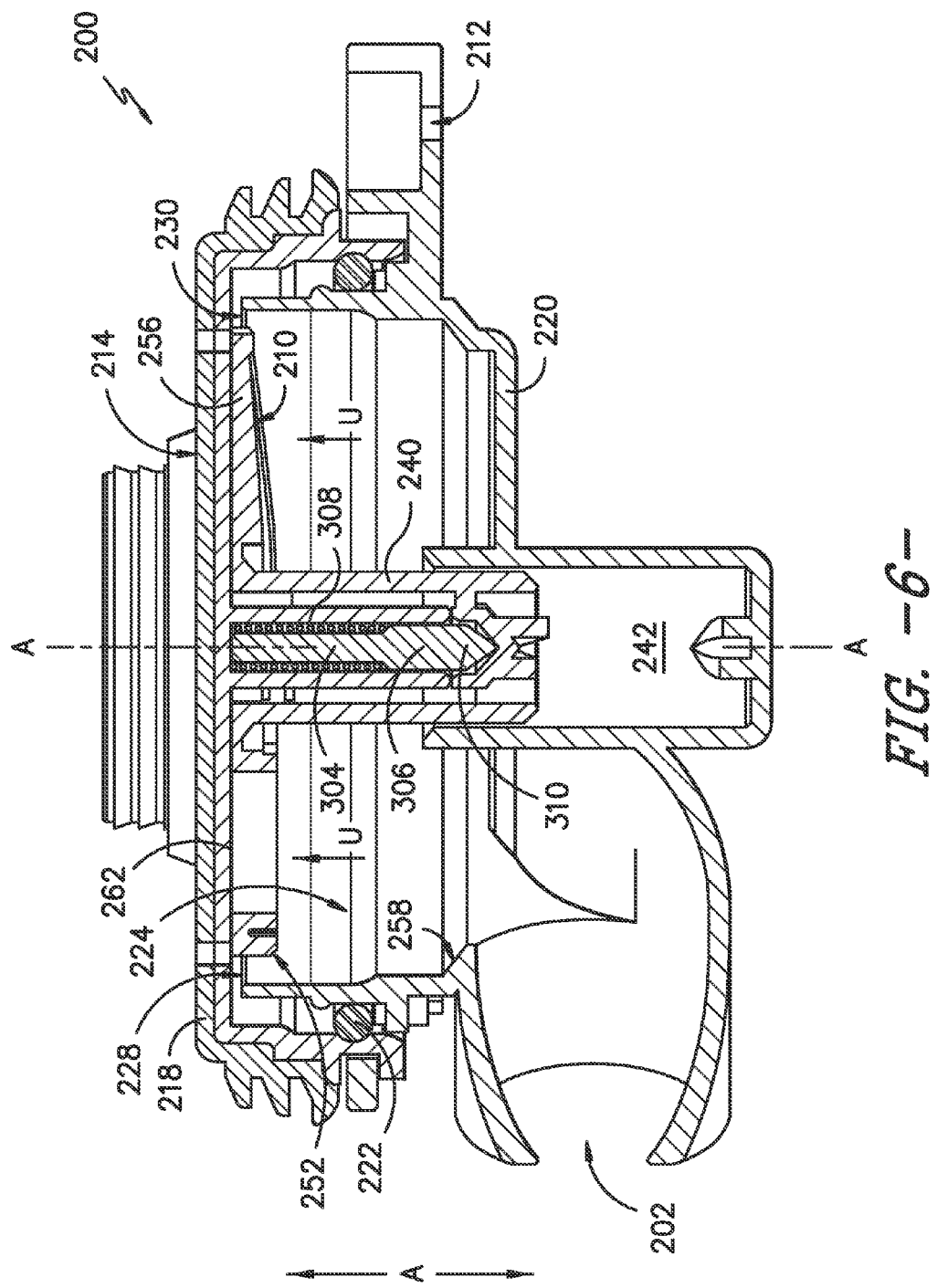
FIG. -6-

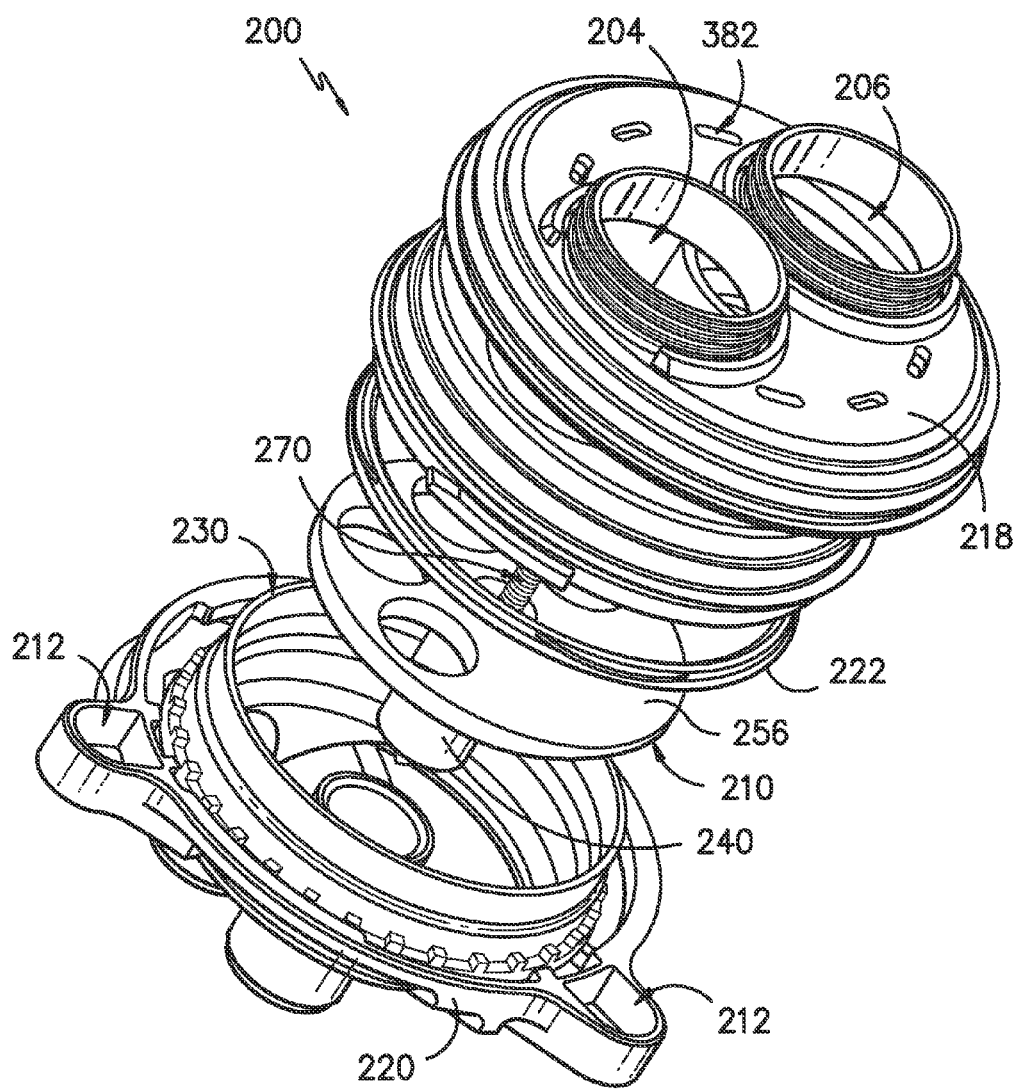
FIG. -7-

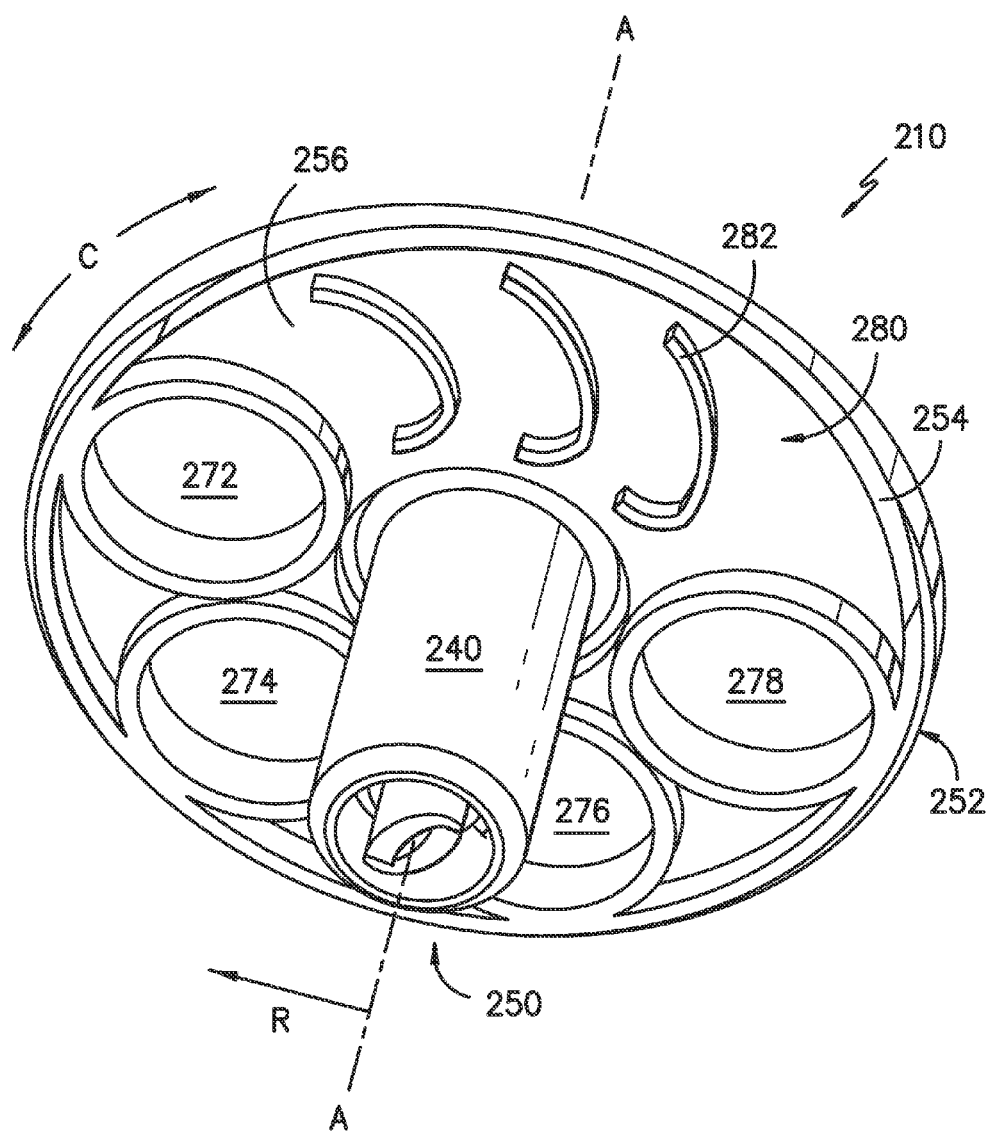
FIG. -8-

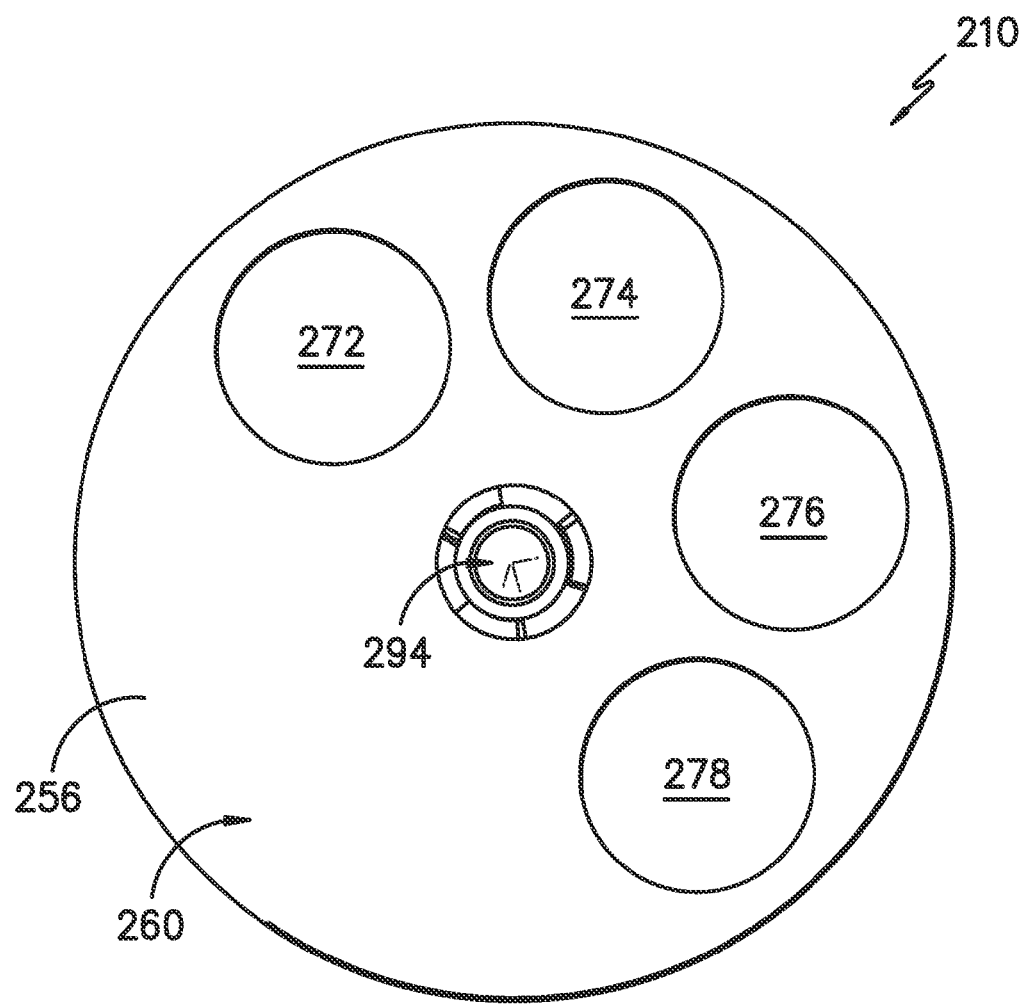
FIG. -9-

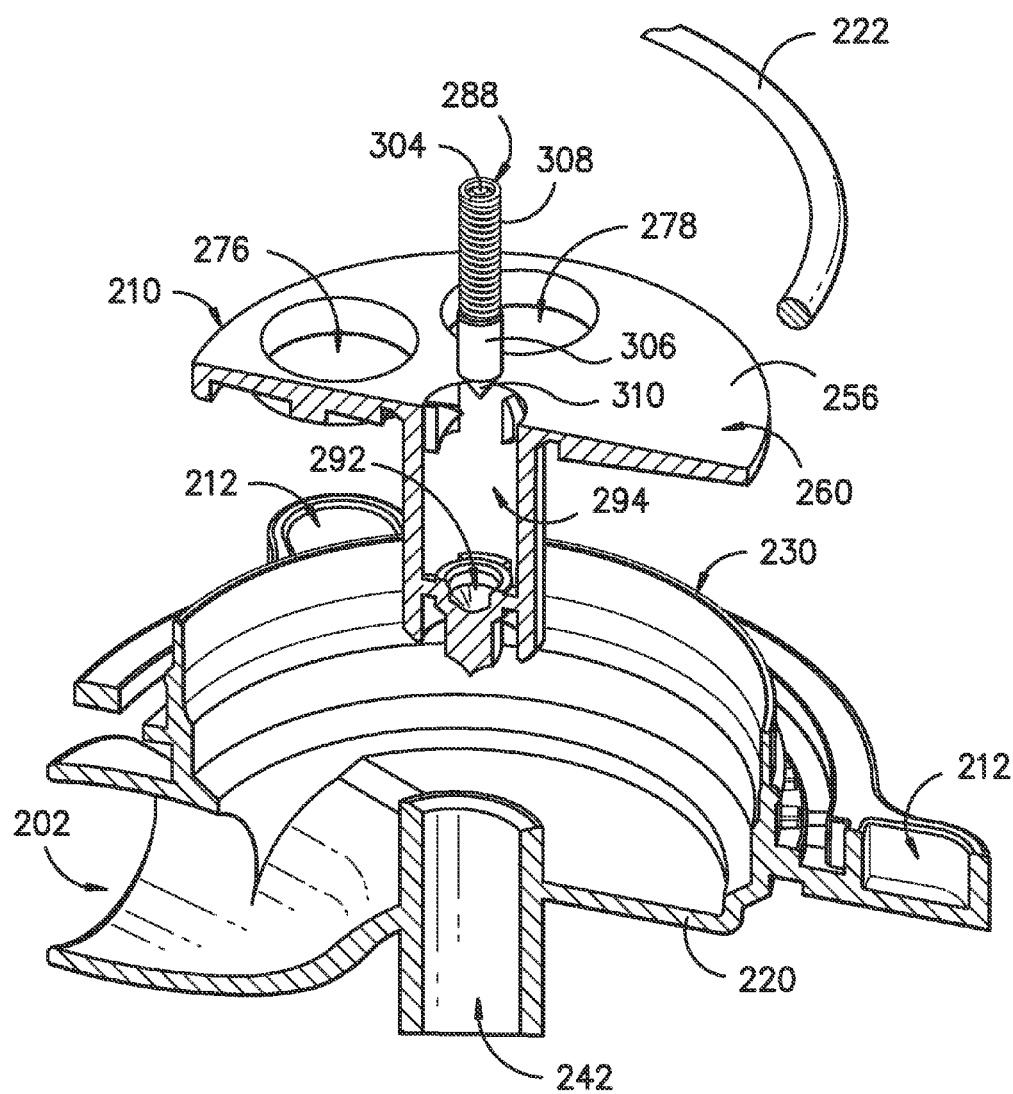
FIG. -10-

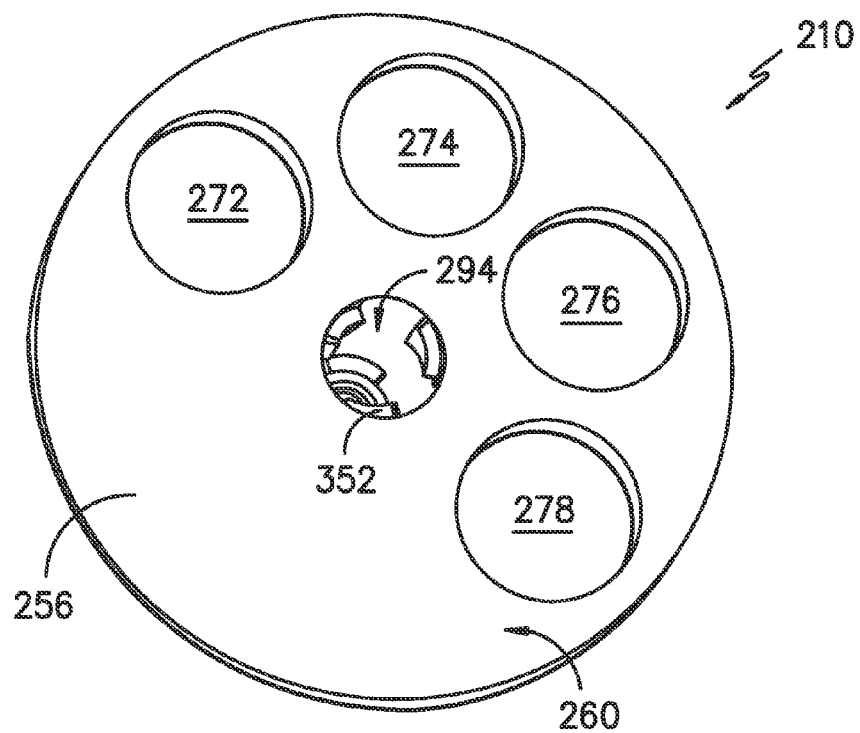
FIG. -11-
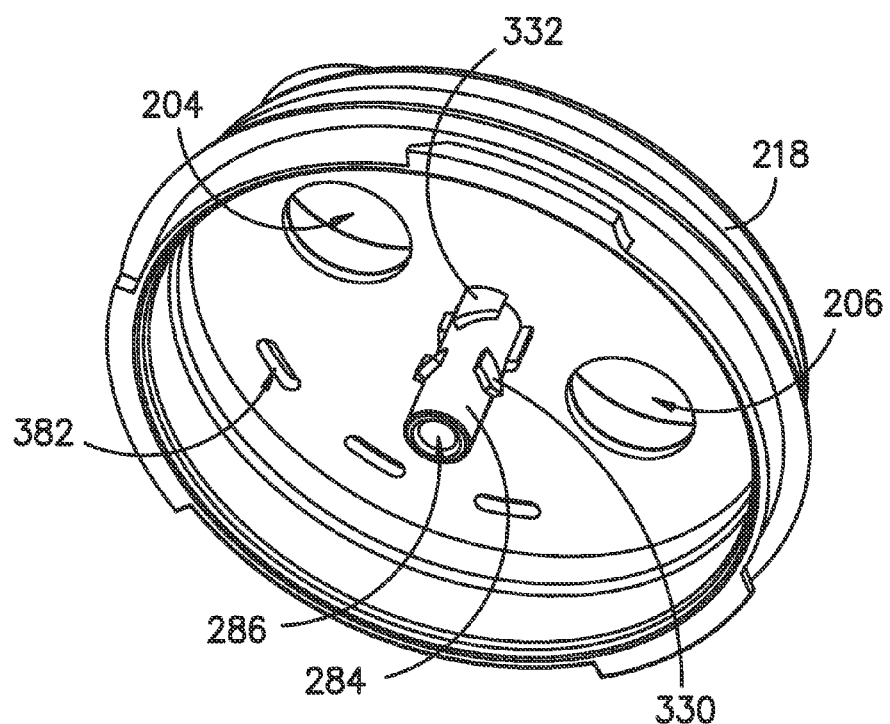
FIG. -12-

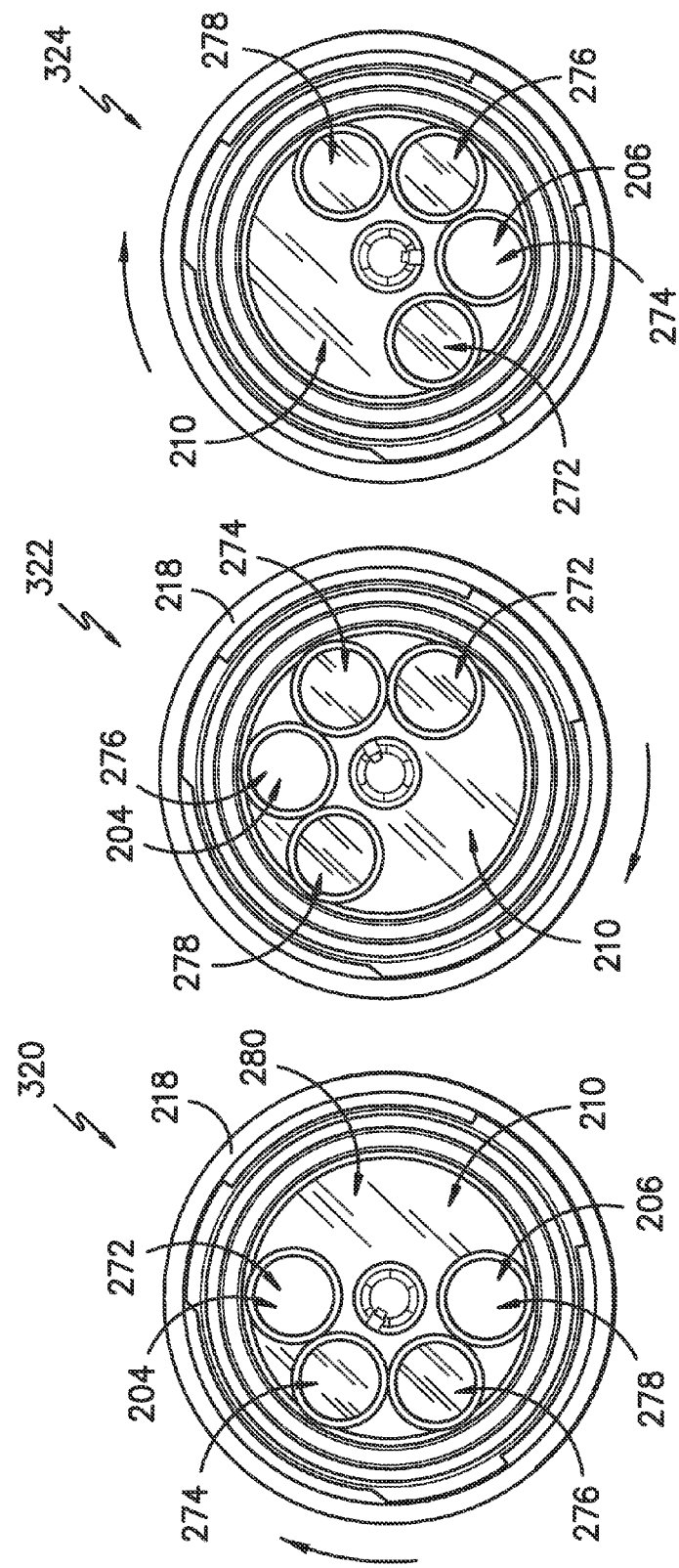
FIG. -13-

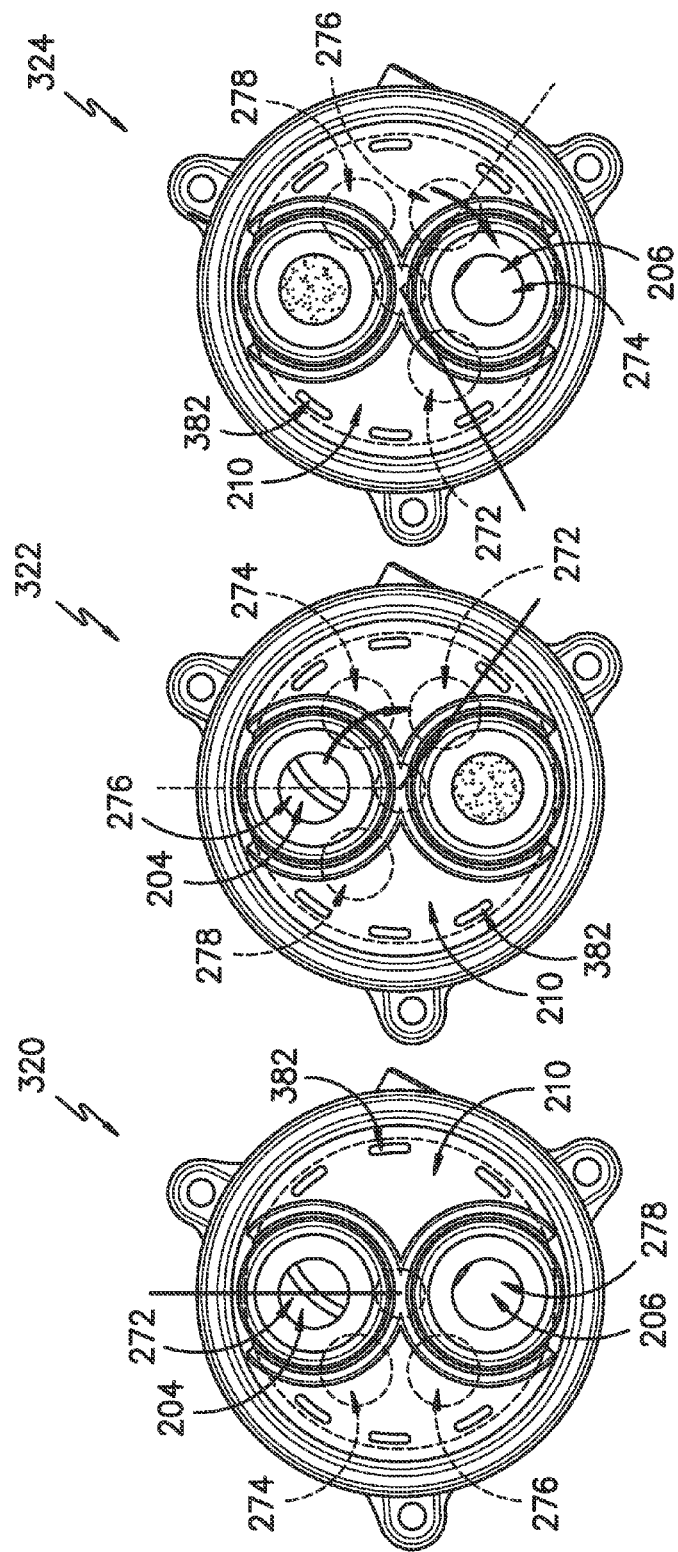
FIG. -14-

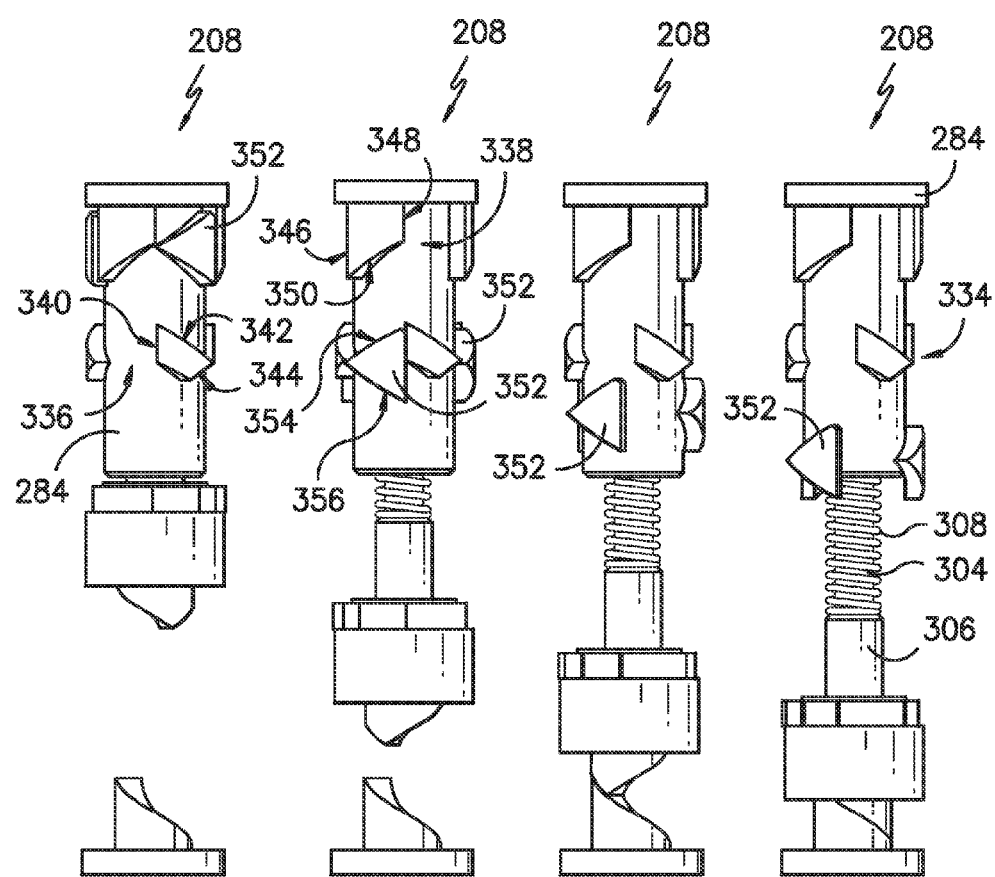
FIG. -15-

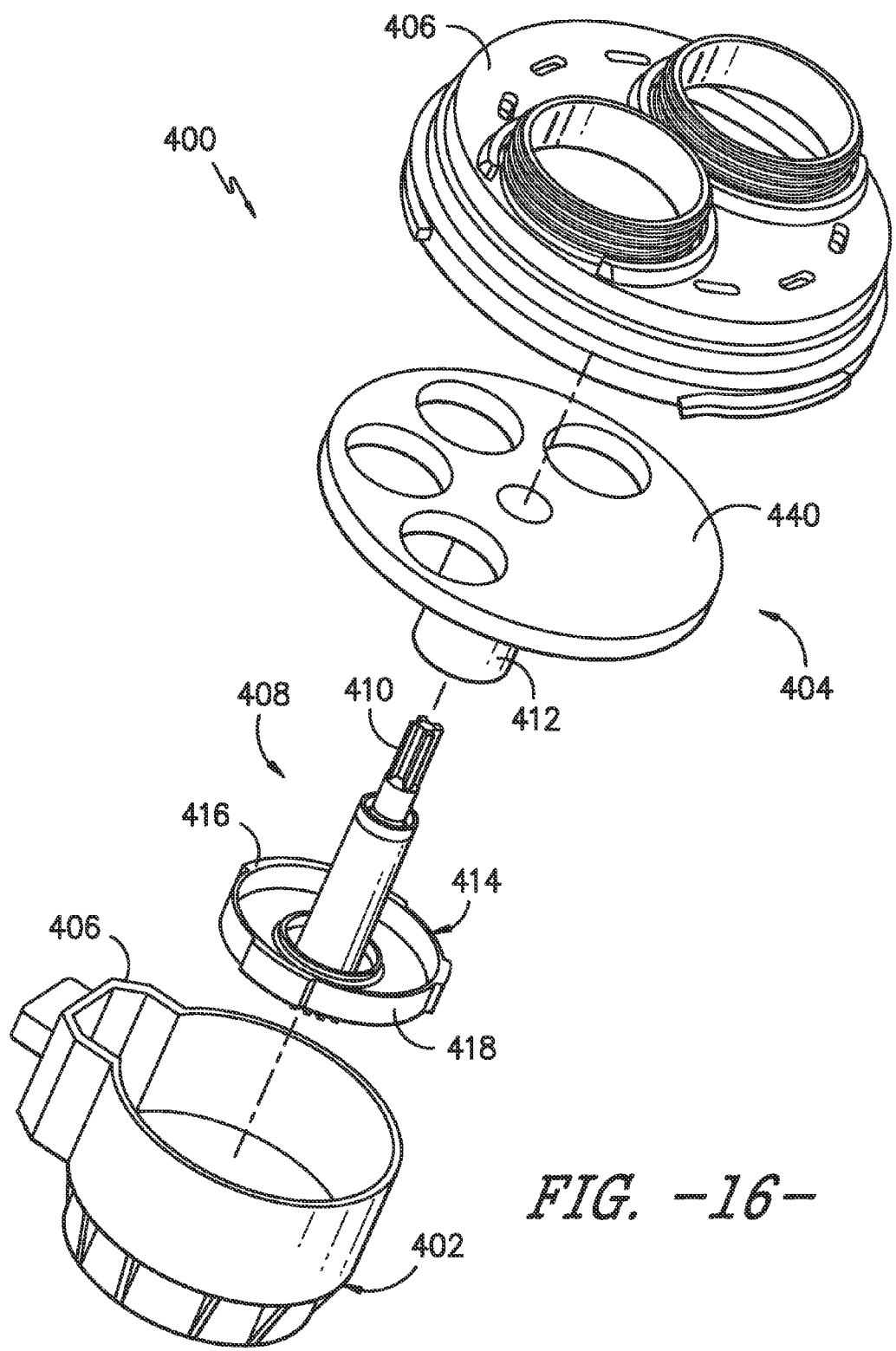
FIG. -16-

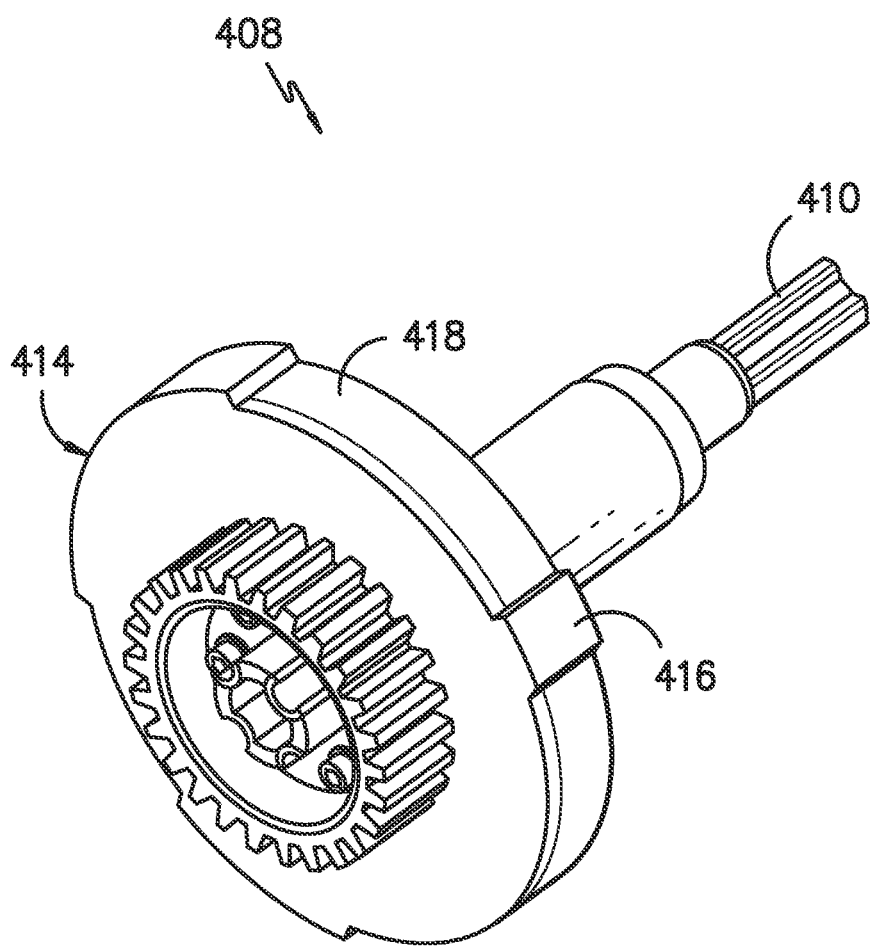
FIG. -17-

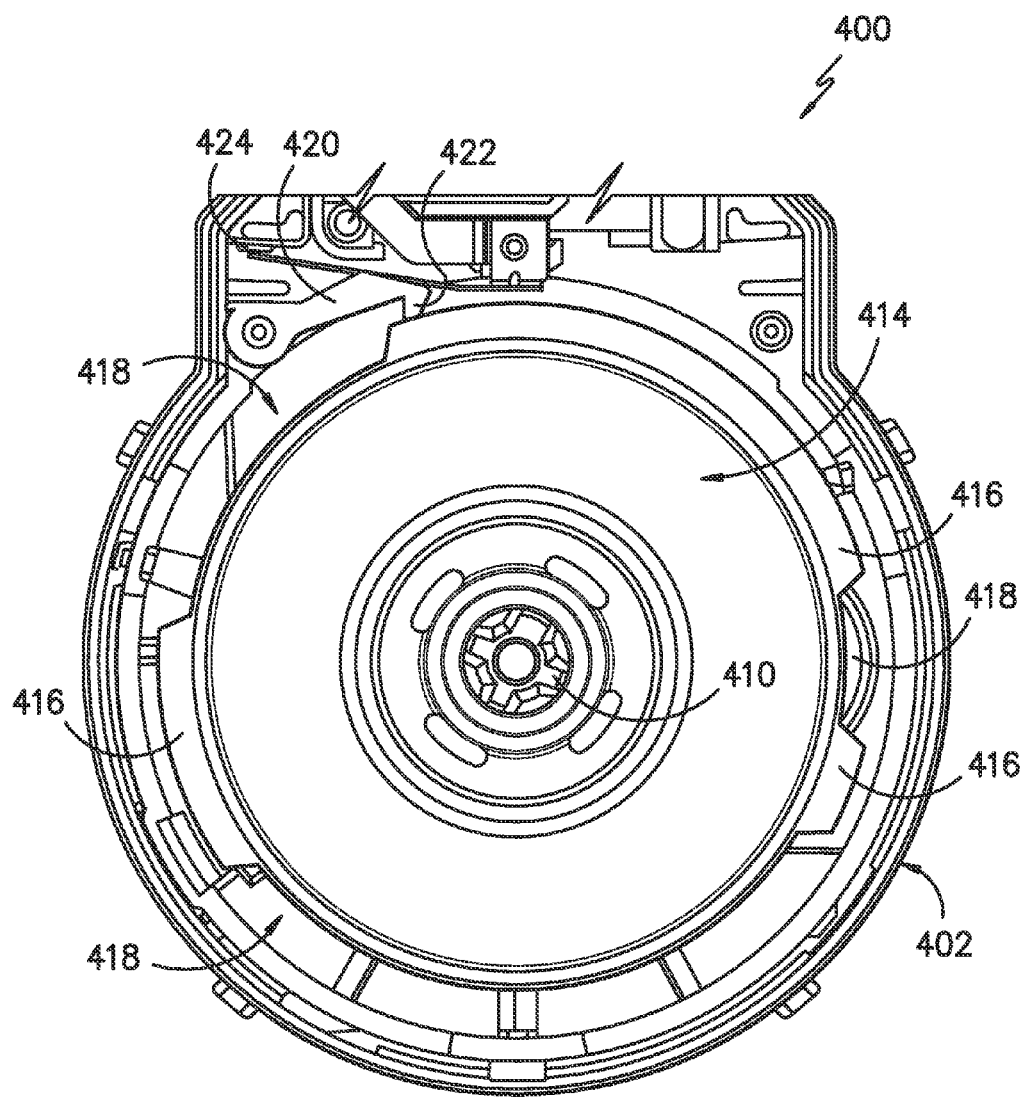
FIG. -18-

VARIABLE POSITION DIVERTER FOR AN APPLIANCE

FIELD OF THE INVENTION

The subject matter of the present disclosure relates generally to a diverter for an appliance.

BACKGROUND OF THE INVENTION

Dishwasher appliances generally include a tub that defines a wash compartment. Rack assemblies can be mounted within the wash compartment of the tub for receipt of articles for washing. Spray assemblies within the wash compartment can apply or direct wash fluid towards articles disposed within the rack assemblies in order to clean such articles. Multiple spray assemblies can be provided including e.g., a lower spray arm assembly mounted to the tub at a bottom of the wash compartment, a mid-level spray arm assembly mounted to one of the rack assemblies, and/or an upper spray assembly mounted to the tub at a top of the wash compartment. Other configurations may be used as well.

A dishwashing appliance is typically equipped with at least one pump for circulating fluid through the multiple spray assemblies. In addition, a device, referred to as a diverter, may be used to control the flow of fluid received from the pump. For example, the diverter can be used to selectively control which spray assemblies receive a flow of fluid. In one construction, the diverter uses an electrically powered motor to rotate a valve between different ports for fluid control. Another construction uses a hydraulically actuated rotation mechanism to position a diverter valve to provide the desired fluid flow between spray assemblies without the need for a motor.

The diverter is a significant tool for complying with government regulations related to total energy and water usage for a dishwasher cycle. For example, a dishwasher may use a diverter to run only one spray assembly at a time, thereby decreasing the amount of water required to run a cycle compared to a dishwasher that runs all spray assemblies at the same time. Therefore, a dishwasher with a diverter may be more capable of meeting government regulations than a dishwasher without a diverter. However, because only one rack is being washed at a time, the total cycle time must increase so that the total wash time for each rack and the overall wash performance may be maintained. Although diverters are useful in meeting governmental regulations, conventional diverters typically provide little versatility to a user in selecting different flow combinations, which can increase cycle times and lead to a poor consumer perception of the washing machine appliance.

Accordingly, a dishwashing appliance that can be configured to selectively control the flow of fluid through one or more different spray assemblies or other fluid elements would be useful. More particularly, a variable position diverter for a dishwasher appliance providing reliable, versatile, and useful flow combinations to a plurality of spray assemblies using variable flows paths and rates would be especially beneficial.

BRIEF DESCRIPTION OF THE INVENTION

The present invention provides a variable position diverter that provides wash fluid to selected combinations of outlet ports and spray assemblies. The diverter includes a housing having a first fluid outlet, a second fluid outlet, and a valve disk having four apertures. The valve disk is rotated relative to the housing to align one or more of the four apertures with one or both of the first fluid outlet and the second fluid outlet to selectively control the flow of wash fluid through corresponding spray assemblies. Selectively diverting wash fluid in this manner can improve wash performance and reduce cycle time while meeting government regulations regarding water usage. Additional aspects and advantages of the invention will be set forth in part in the following description, may be apparent from the description, or may be learned through practice of the invention.

In one exemplary embodiment, a dishwasher appliance is provided. The dishwasher appliance includes a wash chamber for receipt of articles for washing, a pump for providing fluid flow for cleaning the articles, and a diverter for selectively controlling the fluid flow to a first spray assembly and a second spray assembly. The diverter defines an axial direction, a radial direction, and a circumferential direction. The diverter includes a housing, a fluid inlet for receiving fluid flow from the pump, a first fluid outlet in fluid communication with the first spray assembly, and a second fluid outlet in fluid communication with the second spray assembly, the first fluid outlet and the second fluid outlet being defined by the housing and being spaced apart by 180 degrees along the circumferential direction. The diverter further includes a valve positioned within the housing, the valve being rotatable along the circumferential direction. The valve includes a disk defining four apertures, the four apertures being positioned along the circumferential direction at 0, 60, 120, and 180 degrees, and a positioning assembly configured to rotate the disk incrementally through three angular positions, each of the three angular positions being separated by 120 degrees.

In another exemplary embodiment, a diverter for selectively controlling fluid flow to a first spray assembly and a second spray assembly in a dishwasher appliance is provided. The diverter defines an axial direction, a radial direction, and a circumferential direction. The diverter includes a housing defining a fluid inlet for receiving fluid flow from a pump, a first fluid outlet in fluid communication with the first spray assembly, and a second fluid outlet in fluid communication with the second spray assembly, the first fluid outlet and the second fluid outlet being spaced apart by 180 degrees along the circumferential direction. The diverter further includes a valve disk positioned within the housing, the valve disk being rotatable along the circumferential direction and defining four apertures, the four apertures being positioned along the circumferential direction at 0, 60, 120, and 180 degrees.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front view of an exemplary embodiment of a dishwashing appliance of the present invention.

FIG. 2 provides a side cross sectional view of the exemplary dishwashing appliance of FIG. 1.

FIG. 3 is a perspective view of an exemplary embodiment of a passive diverter of the present invention.

FIG. 4 is a side view of the exemplary passive diverter of FIG. 3.

FIG. 5 is a cross sectional view of the exemplary passive diverter of FIG. 3 with a diverter valve shown in a first position.

FIG. 6 is also a cross sectional view of the exemplary passive diverter of FIG. 3 with the diverter valve shown in the second position.

FIG. 7 is an exploded view of the exemplary passive diverter of FIG. 3.

FIG. 8 is a bottom perspective view of the diverter valve of the exemplary passive diverter of FIG. 3.

FIG. 9 is a top view of the diverter valve of the exemplary passive diverter of FIG. 3.

FIG. 10 is an exploded cross sectional view of the exemplary passive diverter of FIG. 3.

FIG. 11 is a top perspective view of the diverter valve of the exemplary passive diverter of FIG. 3.

FIG. 12 is a bottom perspective view of a first portion of the housing of the exemplary passive diverter of FIG. 3.

FIG. 13 is a schematic bottom view of a diverter valve inside the first portion of the housing of an exemplary diverter as the diverter valve is rotated between selected angular positions.

FIG. 14 is a schematic top view of the diverter housing showing the diverter valve in phantom as the diverter valve is rotated between selected angular positions.

FIG. 15 is a schematic side view of a boss and a valve channel of the passive diverter of FIG. 3, showing the rotation of the valve channel as it moves from the second position to the first position.

FIG. 16 is an exploded view of a motor-driven diverter according to an exemplary embodiment of the present invention.

FIG. 17 is a bottom perspective view of a gear-driven shaft of the motor-driven diverter of FIG. 16.

FIG. 18 is a top view of a second portion of a housing of the motor-driven diverter of FIG. 16, showing a positioning cam and a spring loaded follower.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to, dishes, pots, pans, silverware, and other cooking utensils and items that can be cleaned in a dishwashing appliance. The term "wash cycle" is intended to refer to one or more periods of time during the cleaning process where a dishwashing appliance operates while containing articles to be washed and uses a detergent and water, preferably with agitation, to e.g., remove soil particles including food and other undesirable elements from the articles. The term "rinse cycle" is intended to refer to one or more periods of time during the cleaning process in which the dishwashing appliance operates to remove residual soil, detergents, and other undesirable elements that were retained by the articles after completion of the wash cycle. The term "drying cycle" is intended to refer to one or more periods of time in which the dishwashing appliance is operated to dry the articles by removing fluids from the wash chamber. The term "fluid" refers to a liquid used for washing and/or rinsing the articles and is typically made up of water that may include additives such as e.g., detergent or other treatments. The use of the terms "top" and "bottom," or "upper" and "lower" herein are used for reference only as exemplary embodiments disclosed herein are not limited to the vertical orientation shown nor to any particular configuration shown; other constructions and orientations may also be used.

FIGS. 1 and 2 depict an exemplary domestic dishwasher 100 that may be configured in accordance with aspects of the present disclosure. For the particular embodiment of FIGS. 1 and 2, the dishwasher 100 includes a cabinet 102 having a tub or inner liner 104 therein that defines a wash chamber 106. The tub 104 includes a front opening (not shown) and a door 110 hinged at its bottom 112 for movement between a normally closed vertical position (shown in FIGS. 1 and 2), wherein the wash chamber 106 is sealed shut for washing operation, and a horizontal open position for loading and unloading of articles from the dishwasher 100. Latch 116 is used to lock and unlock door 110 for access to chamber 106.

Upper and lower guide rails 120, 122 are mounted on tub side walls 124 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by the racks 126, 128.

The dishwasher 100 further includes a lower spray-arm assembly 140 that is rotatably mounted within a lower region 142 of the wash chamber 106 and above a tub sump portion 144 so as to rotate in relatively close proximity to rack assembly 128. A mid-level spray-arm assembly 146 is located in an upper region of the wash chamber 106 and may be located in close proximity to upper rack 126. Additionally, an upper spray assembly 148 may be located above the upper rack 126.

The lower and mid-level spray-arm assemblies 140, 146 and the upper spray assembly 148 are part of a fluid circulation assembly 150 for circulating water and dishwasher fluid in the tub 104. The fluid circulation assembly 150 also includes a pump 152 positioned in a machinery compartment 154 located below the tub sump portion 144 (i.e., bottom wall) of the tub 104, as generally recognized in the art. Pump 152 receives fluid from sump 144 and provides a flow to the inlet 202 of a diverter, such as passive diverter 200, as more fully described below.

Each spray-arm assembly 140, 146 includes an arrangement of discharge ports or orifices for directing washing liquid received from diverter 200 onto dishes or other articles located in rack assemblies 126 and 128. The arrangement of the discharge ports in spray-arm assemblies 140, 146 provides a rotational force by virtue of washing fluid flowing through the discharge ports. The resultant rotation of the spray-arm assemblies 140, 146 and the operation of spray assembly 148 using fluid from diverter 200 provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. Each of these spray assemblies may receive an independent stream of fluid and may be configured to rotate in one or both directions. One skilled in the art will appreciate that the embodiments discussed herein are used for the purpose of explanation only, and are not limitations of the present subject matter.

The dishwasher 100 is further equipped with a controller 156 to regulate operation of the dishwasher 100. The controller 156 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 156 may be positioned in a variety of locations throughout dishwasher 100. In the illustrated embodiment, the controller 156 may be located within a control panel area 158 of door 110 as shown in FIGS. 1 and 2. In such an embodiment, input/output ("I/O") signals may be routed between the control system and various operational components of dishwasher 100 along wiring harnesses that may be routed through the bottom 112 of door 110. Typically, the controller 156 includes a user interface panel/controls 160 through which a user may select various operational features and modes and monitor progress of the dishwasher 100. In one embodiment, the user interface 160 may represent a general purpose I/O ("GPIO") device or functional block. In one embodiment, the user interface 160 may include input components, such as one or more of a variety of electrical, mechanical or electro-mechanical input devices including rotary dials, push buttons, and touch pads. The user interface 160 may include a display component, such as a digital or analog display device designed to provide operational feedback to a user. The user interface 160 may be in communication with the controller 156 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 160, different configurations may be provided for racks 126, 128, different spray arm assemblies 140, 146, 148 may be used, and other differences may be applied as well.

FIGS. 3 and 4 provide a top perspective view and a side view, respectively, of an exemplary embodiment of a passive diverter 200 of the present invention. Passive diverter 200 defines an axial direction A, a radial direction R, and a circumferential direction C (see, e.g., FIGS. 3 and 4). Passive diverter 200 has a fluid inlet 202 for receiving a flow of fluid from pump 152 that is to be supplied to spray assemblies 140, 146, and/or 148 as well as other fluid-using components during cleaning operations. As stated, pump 152 receives fluid from e.g., sump 144 and provides a fluid flow to diverter 200.

For this exemplary embodiment, diverter 200 includes a plurality of outlet ports—shown in FIG. 3 and FIG. 4 as first outlet port 204 and a second outlet port 206. However, this configuration is used only for the purpose of explaining the hydraulic actuation mechanism 208 (see, e.g., FIG. 15). Indeed, in other embodiments of the invention, three, four, or more than four outlet ports may be used with diverter 200 depending upon e.g., the number of switchable ports desired for selectively placing pump 152 in fluid communication with different fluid-using elements of appliance 100. Diverter 200 includes a valve 210 (see, e.g., FIG. 8), more fully described below, that can be selectively switched between ports 204 and 206 by using either hydraulic actuation mechanism 208 or a separate motor.

By way of example, first outlet port 204 can be fluidly connected with upper spray assembly 148 and lower spray arm assembly 140 and second outlet port can be fluidly connected with mid-level spray arm assembly 146. Other spray assemblies and connection configurations may be used as well. As such, the rotation of valve 210 in passive diverter 200 or an active diverter 400 can be used to selectively place pump 152 in fluid communication with spray assemblies 140, 146, or 148 by way of outlet ports 204 and 206, as described in an exemplary embodiment below. Diverter 200 also includes multiple apertures 212 that allow for fastening diverter 200 to the sump 142 of wash tub 104 (FIG. 2).

Referring now to FIGS. 3 through 7, passive diverter 200 is constructed from a housing 214 that includes a first portion 218 and a second portion 220. An O-ring 222 provides a fluid seal therebetween. Housing 214 defines a chamber 224 into which fluid flows through its fluid inlet 202. Chamber 224 also defines a fluid outlet 228, which is formed by the circular edge 230 at the top of second portion 220 (FIGS. 5 and 6). In this manner, the chamber may provide fluid communication into the chamber 224 through the fluid inlet 202 and out of the chamber through the fluid outlet 228 to one or more of the outlet ports 204, 206.

Valve 210 is positioned within fluid outlet 228 of chamber 224 and may be defined with respect to the axial direction A, the radial direction R, and the circumferential direction C (see, e.g., FIG. 8). More particularly, valve 210 includes a cylindrically-shaped shaft 240 that extends along the axial direction A and is received into a cylindrically-shaped well 242 formed by second portion 220 of housing 214. This cylindrically-shaped shaft 240 is slidably received within the well 242 of the housing 214, such that valve 210 is rotatable about axis A-A relative to housing 214 and movable back and forth along axial direction A.

As can be seen by comparing FIGS. 5 and 6, valve 210 is movable along the axial direction A (or along axis A-A, which is parallel to the axial direction A) between a first position shown in FIG. 5 and a second position shown in FIG. 6. In the first position shown in FIG. 5, valve 210 rests on second portion 220 of housing 214. More particularly, valve 210 may include a frustoconical surface 252 positioned on the distal end of a flange 254. In turn, flange 254 projects along axial direction A from the circular main body, or disk 256, of valve 210 towards second portion 220 of housing 214. In the first position, frustoconical surface 252 rests in a complementary manner on an interior surface 258 of second portion 220 that is also frustoconical in shape. In the second position shown in FIG. 6, valve 210 is pressed against first portion 218 of housing 214. For this exemplary embodiment, a top surface 260 (FIG. 9) of valve 210 contacts an interior surface 262 of first portion 218.

Movement of valve 210 back and forth between the first position shown in FIG. 5 and the second position shown in FIG. 6 is provided by two opposing forces: i) a flow of water passing through diverter 200 that is counteracted by ii) a biasing element 270. More particularly, when pump 152 is off, biasing element 270 pushes along axial direction A against valve 210 and forces it downward along axis A-A (arrows D) to the position shown in FIG. 5. Conversely, when there is a sufficient flow of fluid F through diverter housing 200, the momentum of fluid exiting chamber 224 through the fluid outlet 228 of housing 214 will impact valve 210. As the fluid passes through apertures 272, 274, 276, 278 to exit diverter 200 through one of the outlet ports 204, 206, this momentum overcomes the force provided by biasing element 270 so as to shift valve 210 along axial direction A (arrows U) away from diverter bottom 220 towards diverter top 218 to a second position shown in FIG. 6.

Flange 254 assists in capturing the momentum provided by fluid flow through fluid outlet 220. In addition, as shown in FIG. 8, a bottom surface 280 of disk 256 of valve 210 may further include a plurality of arcuate ribs 282. These arcuate ribs 282 capture the momentum and of the fluid flow and tend to cause the valve 210 to rotate in only one direction. The arcuate ribs 282 cause the valve 210 to rotate in a clockwise manner about axis A when viewed from bottom of valve 210. As shown in FIG. 8, the disk 256 may include three arcuate ribs 282. However, one skilled in the art will appreciate that any number of arcuate ribs may be used. Similarly, the ribs may be different size, shape, or orientation depending on the needs of the application.

Valve 210 will remain in the second position until the fluid flow ends or drops below a certain flow rate. Then, biasing element 270 urges valve 210 along axial direction A away from diverter top 218 towards diverter bottom 220 and back into the first position shown in FIG. 5. As shown in the exemplary embodiment of FIGS. 5, 6, and 11, the biasing element 270 extends between a boss 284 of first portion 218 and the valve shaft 240 and is configured to urge the valve 210 toward the first position. In this regard, boss 284 may define a recess 286 into which a top end 288 of the biasing element 270 may be slidably received, and a bottom end 290 of the biasing element 270 may be received in a conically-shaped seat 292 defined, for example, at the bottom of an interior channel 294 of valve shaft 240.

As best shown in FIG. 10, the biasing element 270 may be, for example, a plunger 302 including a plunger shaft 304 connected with a plunger head 306. The plunger head 306 may have a larger diameter than the plunger shaft 304 and a compression spring 308 may be received onto the plunger shaft 304 and compressed against the plunger head 306. In the exemplary embodiment, the plunger head 306 has a conically-shaped tip 310 that is received in conically-shaped seat 292. One skilled in the art will appreciate that the above-described biasing element 270 is only an example, and other types of biasing elements are possible. For example, in some embodiments, the biasing element may be a simple compression spring.

The movement of valve 210 back and forth along axis A-A between the first and second positions shown in FIGS. 5 and 6 also causes valve 210 to rotate about axis A-A so that apertures 272, 274, 276, 278 are switched between outlet ports 204 and 206. For this exemplary embodiment, a single movement in either direction (arrow U or arrow D) causes valve 210 to rotate 60 degrees. Accordingly, valve 210 rotates about axis A-A a full 120 degrees each time it is moved out of, and then returned to, the second position (FIG. 6).

As noted above, disk 256 of valve 210 may include a plurality of apertures 272, 274, 276, 278 which may be selectively placed in fluid communication with one or more outlet ports 204, 206 to provide fluid flow to spray assemblies 140, 146, and 148. For example, as shown in the illustrated embodiment of FIGS. 8 and 9, disk 256 may include a first aperture 272, a second aperture 274, a third aperture 276, and a fourth aperture 278. Disk 256 can be rotated so as to place one or more of its apertures 272, 274, 276, 278 in fluid communication with one or more of outlet ports 204, 206. As shown in FIG. 12, fluid outlet ports 204, 206 are spaced apart circumferentially on first portion 218 of housing 214 by 180 degrees. Apertures 272, 274, 276, 278 are positioned along the circumferential direction at 0, 60, 120, and 180 degrees, respectively.

Notably, this geometry of outlet ports 204, 206 and apertures 272, 274, 276, 278 provides three modes of operation when disk 256 is configured to rotate in 120 degree increments. As described below, this rotation may be achieved by using three cams along with three upper and three lower guide elements to provide 120 degrees of rotation. This operation is shown schematically in FIGS. 13 and 14, which show disk 256 of valve 210 rotating (as viewed looking up on first portion 218 in FIG. 13 and looking down on first portion 218 in FIG. 14) within first portion 218 of housing 214 in 120 degree increments. A first angular position 320 corresponds with a dual-spray configuration because apertures 272 and 278 are each in fluid communication with one of outlet ports 204 and 206 while apertures 274 and 276 are blocked. Therefore, when valve 210 is rotated to place disk 256 in a first angular position 320, a flow of fluid from pump 152 is supplied to spray assemblies 140, 146, and 148. Similarly, when disk 256 is rotated within housing 214 to a second angular position 322, which is 120 degrees from the first angular position 320, aperture 276 is in fluid communication with fluid outlet port 204, but apertures 272, 274, and 278 are blocked, as is fluid outlet port 206. In this manner, a flow of fluid from pump 152 is supplied only to spray assemblies 140 and 148. When disk 256 is rotated another 120 degrees to a third angular position 324, aperture 274 is in fluid communication with fluid outlet port 206, but apertures 272, 276, and 278 are blocked, as is fluid outlet port 204. In this manner, a flow of fluid from pump 152 is supplied only to spray assembly 148. Finally, when disk 256 is rotated another 120 degrees, disk 256 has returned to its first angular position 320, and dual-spray operation is resumed. As such, passive diverter 200 can be used to selectively provide fluid flow from pump 152 through outlet ports 204 and 206 in three operating modes. The manner in which disk 256 of valve 210 is rotated in 120 degree increments, thus indexing between the three modes of operation, is described in more detail below.

Although the illustrated embodiment shows a valve 210 and disk 256 having four apertures 272, 274, 276, 278 and rotating in 120 degree increments, one skilled in the art will appreciate that this configuration is provided only as an example. Disk 256 may have more or fewer apertures and may be indexed in different increments. In addition, the increments may not be constant, but may instead vary according to the needs of the application. Similarly, housing 214 may have more than two outlet ports, and the scheduling of fluid communication between disk 256 and the outlet ports may be manipulated as desired.

Referring now to FIG. 12, a cylindrically-shaped boss 284 extends along axis A-A from first portion 218 of housing 214 into an interior channel 294 (FIGS. 9 through 11) defined by valve 210. As mentioned above, boss 284 defines recess 286 into which a first end 288 of biasing element 270 is received. Boss 284 also includes a plurality of guide elements 330 and 332 that are spaced apart from each other along circumferential direction C and extend radially outward from the boss 284. A first plurality of lower guide elements 330, are located near a midpoint 334 of boss 284 while a second plurality of upper guide elements 332 are located near diverter top 218. Upper and lower guide elements 330, 332 are spaced apart along axial direction A and are also offset from each other along circumferential direction C. More particularly, as best seen in FIG. 15, along axial direction A, each of upper guide elements 332 is aligned with a gap 336 positioned between a respective pair of the lower guide elements 330. Conversely, each of lower guide elements 330 is aligned with a gap 338 between a respective pair of upper guide elements 332.

Referring now to FIGS. 12 and 15, each of lower guide elements 330 may be a projection having a straight side 340 that is parallel to the axial direction A. In addition, lower guide elements 330 may include an upper contact face 342 extending from straight side 340 and forming a non-zero, acute angle from the axial direction A and a lower contact face 344 extending from upper contact face 342 and forming a non-zero, acute angle from the axial direction A. Each of upper guide elements 332 may be a projection having a pair of straight sides 346, 348 that are parallel to the axial direction A. In addition, upper guide elements 332 may include a contact face 350 extending between the pair of straight sides 346, 348 and forming a non-zero, acute angle from the axial direction A. Upper and lower guide elements 330, 332 may thus define contact faces at non-zero angles between zero and 90 degrees from the axial direction A. For the exemplary embodiment shown, this angle is about 45 degrees. In another embodiment, this angle is about 42 degrees. In still another embodiment, this angle is about 40 degrees to about 50 degrees from the axial direction A. However, other angles may be used as well.

As stated and shown, boss 284 is received into an interior channel 294 defined by the shaft of valve 210. Referring to FIGS. 9 through 11, a plurality of cams 352 are positioned on the interior channel 294 of the cylindrical valve shaft 240 and project radially inward (i.e., along radial direction R) from cylindrical shaft 240 into interior channel 294. As best shown in FIG. 15, each cam 352 includes an upper contact face 354 and a lower contact face 356. Each cam 352 is spaced apart from adjacent cams 352 along the circumferential direction C, and each cam 352 is at the same axial position along the axial direction A. In addition, each cam 352 is shown as a triangular shaped projection. However, one skilled in the art will appreciate that this is only an exemplary embodiment of the plurality of cams, and that different cam shapes, configurations, and spacing are contemplated as within the scope of the present invention.

Still referring to FIG. 15, as a flow of fluid overcomes biasing element 270 and valve 210 moves from the first position (FIG. 5) towards the second position (FIG. 6), upper contact face 354 of each cam 352 contacts upper guide element 332 at contact face 350. In this manner, valve 210 is caused to rotate 60 degrees so that each cam 352 moves into gap 338 between a pair of the upper guide elements 332. This movement is guided by contact face 350. In this second position (FIG. 6), apertures 272, 274, 276, 278 may be aligned with one of outlet ports 204 and 206. As the flow of fluid is turned off, biasing element 270 causes valve 210 to move towards the first position (FIG. 5). During this movement, lower contact face 356 of each cam 352 contacts upper contact face 342 of guide element 330 and causes valve 210 to rotate another 60 degrees so that each cam 352 moves into a gap 336 between a pair of lower guide elements 330. This movement is guided by contact face 342. Upon returning to the second position, valve 210 is again caused to rotate by 60 degrees as previously described so that apertures 272, 274, 276, 278 are switched to the next mode of operation, as discussed above. The process can be repeated to switch between modes of operation. In this manner, guide elements 330, 332 and cams 352 are configured to contact each other when valve 210 moves into the second position so as to cause valve 210 to rotate incrementally through a plurality of selected angular positions to provide fluid flow through one or more outlet ports 204, 206.

As stated, passive diverter 200 of the present invention may be used with more than two outlet ports and disk 256 may have less than or more than four apertures. In such case, as will be understood by one of skill in the art using the teachings disclosed herein, the configuration of cams 352 and guide elements 336, 338 described above can be modified to provide the desired amount of rotation between the selected number of outlet ports. For example four cams along with four upper and four lower guide elements are used to provide 90 degrees of rotation between four outlet ports in another exemplary embodiment.

As valve 210 travels from the first position to the second position, wash fluid may become trapped in a region 380 (see, e.g., FIG. 5) between top surface 260 of disk 256 and interior surface 262 of first portion 218 of housing 214. When this occurs, fluid pressure may build up in region 380 which may affect valve 210 movement and performance. For example, the pressure build up may counteract the force of the flowing wash fluid and may prevent disk 256 from forming a proper seal with interior surface 262 of first portion 218 of housing 214, or may even prevent valve 210 from reaching the second position at all. Therefore, it may be desirable to include features on diverter 200 which reduce pressure build up in region 380 and generate a net force that enables valve 210 to form a proper seal.

For example, first portion 218 of housing 214 may define a plurality of slots 382 that relieve pressure as valve 210 is moved along the axial direction A from the first position to the second position. As illustrated in FIG. 14, housing 214 may define six slots, disposed along the circumferential direction C such that they are blocked by valve 210 when valve 210 is in the second position. According to an exemplary embodiment, each of the plurality of slots 382 may be defined by housing 214 at a position radially outside each of the apertures 272, 274, 276, 278 such that each of the plurality of slots 382 never aligns with the one of the four apertures 272, 274, 276, 278.

Although the embodiment described above describes a hydraulically actuated diverter, one skilled in the art will appreciate that other methods of rotating a valve within a diverter may be used. For example, as shown in FIGS. 16 through 18, a motor-driven diverter 400 may use an electric motor 402 to rotate a valve 404. One skilled in the art will appreciate that motor-driven diverter 400 is similar to passive diverter 200 in many respects, such as construction and configuration, except that valve 404 is rotated by motor 402 and does not need to use hydraulically-driven axial movement to rotate. In this regard, electric motor 402 may be associated with housing 406 and may be connected to valve 404 by a gear driven shaft 408. Shaft 408 may include a stem 410 that is received into shaft 412 of valve 404. Accordingly, motor 402 can be used to selectively rotate valve 404 to various positions as will be further described. One skilled in the art will appreciate that a variety of other motor types and configurations may be used, and that the particular embodiment for housing 406 that is shown in the figures is by way of example only.

As illustrated, gear driven shaft 408 may also include a positioning cam 414 concentrically disposed about shaft 408. For example, positioning cam 414 may be a disk defining a plurality of rises 416 extending radially from its perimeter. Each rise 416 may have a different length along the circumferential direction C and may be followed by a valley 418 that is at a nominal radius of positioning cam 414. A spring loaded arm 420 may be positioned in housing 406 and may define a follower 422 that is biased against positioning cam 414. A sensor 424 may be used to detect when spring loaded arm 420 is in a raised position—i.e., is on top of one of rises 416. In this manner, as positioning cam 414 rotates along with shaft 408, spring loaded arm 420 rotates onto and off of the plurality of rises 416. By detecting the amount of time spring loaded arm 420 is on top of rise 416, controller 156 may determine its length. The length of each of the plurality of rises 416 correspond to a particular angular position of shaft 408 and thus valve 404.

The number, position, and profile of the plurality of rises 416 may be adjusted depending on the needs of the application. For example, when it is desirable to have eight operating positions of diverter 400, positioning cam 414 may be configured with eight rises 416. Notably, if there are too many rises 416 on positioning cam 414, valleys 418 may be so short that spring loaded arm 420 never fully engages valley 418 and controller 156 does not sense that valley 418 has been reached. In this case, it may be desirable to reduce the number of rises 416 to fewer than eight. For example, according to the illustrated embodiment, positioning cam 414 has three rises 416, and thus three diverter positions spaced apart by 120 degrees along the circumferential direction C. Controller 156 may be programmed to rotate valve 404 in the desired manner based on the configuration of positioning cam 414.

Although the embodiment described with respect to FIGS. 16 through 18 uses positioning cam 414 to determine the position of valve 404 and control motor 402 accordingly, one skilled in the art will appreciate that other methods of determining the position of valve 404 are possible. For example, one or more magnets may be positioned on valve 404, for example, on a bottom end of valve shaft 412. A sensor, such as a Hall effect sensor, may be placed in the housing to sense the one or more magnets and thereby determine the position of valve 404. Other methods of monitoring the rotation of valve 404 and controlling its rotation with motor 402 are possible and within the scope of the present subject matter.

Although the illustrated embodiment shows apertures 272, 274, 276, 278 having the same size, one skilled in the art will appreciate that the size, shape, or position of apertures 272, 274, 276, 278 may be different in order to achieve different flow characteristics, e.g., flow rates. An adjustment in flow rate may be achieved, for example, by adjusting the cross sectional areas of apertures 272, 274, 276, 278 to either increase or decrease the flow restriction, and consequently, the flow rate. In general, a larger aperture will provide less flow restriction than a smaller aperture, and vice versa. Thus, the flow rate through a fluid outlet may be adjusted by selectively aligning an aperture having a size corresponding with the desired flow rate with the fluid outlet. Such a configuration may enable an adjustable flow rate to a dishwasher 100, even if a single-speed pump is used. This can eliminate the need to use a variable speed pump and may result in reduced costs. A reduction in flow rate may be desirable, for example, to reduce water consumption or to comply with government regulations.

According to an exemplary embodiment, it may be desirable to reduce total flow rate out each outlet port 204, 206 when multiple arms are running, while allowing full flow when a single spray assembly is operating. In this regard, the cross sectional areas of first aperture 272 and fourth aperture 278 may be reduced relative to second aperture 274 and third aperture 276. In the single-arm modes of operation, second aperture 274 is in fluid communication with first outlet port 204 and third aperture 276 is in fluid communication with second outlet port 206, respectively, such that only one spray assemblies receives wash fluid. In these modes of operation, it may be desirable to have large aperture to reduce flow restriction and provide a maximum flow rate to the corresponding spray assembly. By contrast, in the dual-arm mode of operation, first aperture 272 and fourth aperture 278 are in fluid communication with first outlet port 204 and second outlet port 206 simultaneously. In this mode of operation, it may be desirable to reduce the flow rate to each spray assembly in order to reduce the total system flow rate. By reducing the size of first aperture 272 and fourth aperture 278, the total flow rate may be reduced in the dual-arm mode of operation, while a higher relative flow rate may be provided to the first or second spray assembly in the single-arm modes of operation.

As one skilled in the art will appreciate upon reading the present disclosure, the number, size, and position of the outlet ports and apertures discussed herein are used only for the purposes of explanation, and may be varied while remaining within the scope of the present subject matter. For example, more or fewer outlet ports and apertures may be used for a given configuration, and valves 210, 404 may be configured to rotate according to the aperture/outlet configuration. Similarly, apertures may be circular, square, arcuate, oblong, elliptical, or any other shape suitable for achieving the desired fluid flow characteristics through diverters 200, 400. In addition, aspects of this embodiment may be applied to other applications as well. For example, the size of any aperture or fluid outlet may be adjusted and selectively aligned to control the fluid flow rate as desired in any diverter or fluid flow device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:
1. A dishwasher appliance, comprising:
a wash chamber for receipt of articles for washing;
a pump for providing fluid flow for cleaning the articles; and
a diverter for selectively controlling the fluid flow to a first spray assembly and a second spray assembly, the diverter defining an axial direction, a radial direction, and a circumferential direction, the diverter comprising:
  a housing defining a diverter chamber and having a top portion;
  a slot defined in the top portion of the housing for providing fluid communication between the diverter chamber and the wash chamber, the slot having an inlet directly connected to the diverter chamber and an outlet directly connected to the wash chamber;
  a fluid inlet for receiving fluid flow from the pump;
  a first fluid outlet in fluid communication with the first spray assembly and a second fluid outlet in fluid communication with the second spray assembly, the first fluid outlet and the second fluid outlet being defined by the housing and being spaced apart by 180 degrees along the circumferential direction; and
  a valve positioned within the housing, the valve being rotatable along the circumferential direction, the valve comprising:
    a disk defining four apertures, the four apertures being positioned along the circumferential direction at 0, 60, 120, and 180 degrees; and
    a positioning assembly configured to rotate the disk incrementally through three angular positions, each of the three angular positions being separated by 120 degrees.

2. The dishwasher appliance of claim 1, wherein the four apertures comprise a first aperture, a second aperture, a third aperture, and a fourth aperture, and
  wherein the first aperture and the fourth aperture, which are disposed at 0 and 180 degrees, respectively, have smaller cross sectional areas than the second aperture and the third aperture, which are disposed at 60 and 120 degrees, respectively.

3. The dishwasher appliance of claim 1, wherein each of the four apertures have substantially the same cross sectional area.

4. The dishwasher appliance of claim 1, wherein the 120 degree rotations of the disk result in three modes of operation, fluid being provided only to the first spray assembly in a first mode of operation, fluid being provided only to the second spray assembly in a second mode of operation, and fluid being provided both to the first spray assembly and the second spray assembly in a third mode of operation.

5. The dishwasher appliance of claim 1, wherein the positioning assembly comprises a motor configured to rotate a shaft, the shaft being connected to the disk and extending along the axial direction.

6. The dishwasher appliance of claim 1, wherein the positioning assembly comprises:
  a cylindrically-shaped well defined by the housing;
  a cylindrically-shaped shaft connected to the disk and extending along the axial direction, the shaft slidably received within the well of the housing such that the valve is movable between a first position and a second position, the shaft further defining an interior channel having a plurality of cams positioned on the shaft near the disk and projecting radially inward from the shaft into the interior channel;
  a boss extending along the axial direction from the housing into the interior channel of the valve, the boss defining a plurality of guide elements positioned on the boss near the housing and extending radially outward from the boss; and
  a biasing element extending between the boss and the valve and configured to urge the valve towards the first position,
  wherein the guide elements and the cams are configured to contact each other when the valve moves into the second position so as to cause the valve to rotate incrementally through the three angular positions.

7. The dishwasher appliance of claim 6, wherein the disk has a first face oriented towards the first fluid outlet and an opposing second face, and wherein a plurality of arcuate ribs are disposed on the second face.

8. The dishwasher appliance of claim 6, wherein the slot is one of a plurality of slots defined in the top portion of the housing, the plurality of slots relieving pressure as the disk is moved along the axial direction from the first position to the second position, the plurality of slots being disposed along the circumferential direction such that they are blocked by the disk when the disk is in the second position.

9. The dishwasher appliance of claim 8, wherein the plurality of slots comprises six slots.

10. The dishwasher appliance of claim 8, wherein each of the plurality of slots is defined by the housing at a position radially outside each of the four apertures, such that each of the plurality of slots never aligns with the one of the four apertures.

11. A diverter for selectively controlling fluid flow to a first spray assembly and a second spray assembly, the diverter defining an axial direction, a radial direction, and a circumferential direction, the diverter comprising:
  a housing defining a diverter chamber and having a top portion, the top portion defining a slot having an inlet directly connected to the diverter chamber and an outlet directly connected to a wash chamber of a dishwasher appliance, the housing further defining a fluid inlet for receiving fluid flow from a pump, a first fluid outlet in fluid communication with the first spray assembly, and a second fluid outlet in fluid communication with the second spray assembly, the first fluid outlet and the second fluid outlet being spaced apart by 180 degrees along the circumferential direction; and
  a valve disk positioned within the housing, the valve disk being rotatable along the circumferential direction and defining four apertures, the four apertures being positioned along the circumferential direction at 0, 60, 120, and 180 degrees.

12. The diverter of claim 11, further comprising a positioning assembly configured to rotate the valve disk incrementally through three angular positions, each of the three angular positions being separated by 120 degrees.

13. The diverter of claim 11, wherein the four apertures comprise a first aperture, a second aperture, a third aperture, and a fourth aperture, and
  wherein the first aperture and the fourth aperture, which are disposed at 0 and 180 degrees, respectively, have smaller cross sectional areas than the second aperture and the third aperture, which are disposed at 60 and 120 degrees, respectively.

14. The diverter of claim 12, wherein the 120 degree rotations of the valve disk result in three modes of operation, fluid being provided only to the first spray assembly in a first mode of operation, fluid being provided only to the second spray assembly in a second mode of operation, and fluid being provided both to the first spray assembly and the second spray assembly in a third mode of operation.

15. The diverter of claim 12, wherein the positioning assembly comprises a motor configured to rotate a shaft, the shaft being connected to the valve disk and extending along the axial direction.

16. The diverter of claim 12, wherein the positioning assembly comprises:
  a cylindrically-shaped well defined by the housing;
  a cylindrically-shaped shaft connected to the valve disk and extending along the axial direction, the shaft slidably received within the well of the housing such that the valve disk is movable between a first position and a second position, the shaft further defining an interior channel having a plurality of cams positioned on the shaft near the valve disk and projecting radially inward from the shaft into the interior channel;
  a boss extending along the axial direction from the housing into the interior channel of the valve disk, the boss defining a plurality of guide elements positioned on the boss near the housing and extending radially outward from the boss; and
  a biasing element extending between the boss and the valve disk and configured to urge the valve disk towards the first position,
  wherein the guide elements and the cams are configured to contact each other when the valve disk moves into the second position so as to cause the valve disk to rotate incrementally through the three angular positions.

17. The diverter of claim 16, wherein the valve disk has a first face oriented towards the first fluid outlet and an opposing second face, and wherein a plurality of arcuate ribs are disposed on the second face.

18. The diverter of claim 16, wherein the slot is one of a plurality of slots defined in the top portion of the housing, the plurality of slots relieving pressure as the disk is moved along the axial direction from the first position to the second position, the plurality of slots being disposed along the circumferential direction such that they are blocked by the disk when the disk is in the second position.

19. The diverter of claim 18, wherein each of the plurality of slots is defined by the housing at a position radially outside each of the four apertures, such that each of the plurality of slots never aligns with the one of the four apertures.

20. A dishwasher appliance, comprising:
  a wash chamber for receipt of articles for washing;
  a pump for providing fluid flow for cleaning the articles; and
  a diverter for selectively controlling the fluid flow to a first spray assembly and a second spray assembly, the diverter defining an axial direction, a radial direction, and a circumferential direction, the diverter comprising:
    a housing;
    a fluid inlet for receiving fluid flow from the pump;
    a first fluid outlet in fluid communication with the first spray assembly and a second fluid outlet in fluid communication with the second spray assembly, the first fluid outlet and the second fluid outlet being defined by the housing and being spaced apart by 180 degrees along the circumferential direction; and
    a valve positioned within the housing, the valve being rotatable along the circumferential direction, the valve comprising a disk defining four apertures, the four apertures being positioned along the circumferential direction at 0, 60, 120, and 180 degrees; and
  a positioning assembly configured to rotate the disk incrementally through a first angular position, a second angular position, and a third angular position, each of the first, second, and third angular positions being separated by 120 degrees,
  wherein the first aperture and the fourth aperture are in fluid communication with the first fluid outlet and the second fluid outlet, respectively, when the disk is in the first angular position, the third aperture is in fluid communication with the first fluid outlet when the disk is in the second angular position, and the second aperture is in fluid communication with the second fluid outlet when the disk is in the third angular position.

* * * * *